(12) United States Patent
Bullock et al.

(10) Patent No.: US 9,598,165 B2
(45) Date of Patent: Mar. 21, 2017

(54) GAS BARRIER MATERIAL WITH ATOMIC SHEET

(71) Applicant: Lockheed Martin Corporation, Bethesda, MD (US)

(72) Inventors: Steven Edward Bullock, Canton, GA (US); Jaime Ballester, Newhall, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 637 days.

(21) Appl. No.: 14/045,368

(22) Filed: Oct. 3, 2013

(65) Prior Publication Data

US 2016/0046795 A1 Feb. 18, 2016

Related U.S. Application Data

(60) Provisional application No. 61/710,904, filed on Oct. 8, 2012.

(51) Int. Cl.
*B64B 1/58* (2006.01)
*B65D 25/14* (2006.01)
(Continued)

(52) U.S. Cl.
CPC ............... *B64B 1/58* (2013.01); *B64B 1/40* (2013.01); *B65D 25/14* (2013.01); *C08J 7/06* (2013.01);
(Continued)

(58) Field of Classification Search
CPC ............ Y10T 428/24752; Y10T 428/19; Y10T 428/164; Y10T 428/30; Y10T 428/2991; B64B 1/14; B64B 1/40; B64B 1/58
See application file for complete search history.

(56) References Cited

U.S. PATENT DOCUMENTS 4,842,007 A * 6/1989 Kurtz .................... A63H 27/10
137/223
6,290,172 B1 * 9/2001 Yajima ..................... B64B 1/58
244/31
(Continued)

FOREIGN PATENT DOCUMENTS

CN 102 173 145 A 9/2011

OTHER PUBLICATIONS

Translation of CN102183145, Sep. 7, 2011.*
(Continued)

*Primary Examiner* — Justin Rephann
(74) *Attorney, Agent, or Firm* — Reising Ethington P.C.

(57) ABSTRACT

A gas barrier material includes an atomic sheet, such as graphene and/or an analog of graphene. The gas barrier material can be arranged as part of a component, such as a container or other vessel, to limit the flow or permeation of gas through the component. Where the component is a container or part of a container, the gas barrier material may be formulated and arranged to limit or prevent gas ingress or egress with respect to the internal volume of the container. The atomic sheet offers improved gas barrier properties compared to traditional polymeric barrier materials and is particularly useful in applications where it is desired to limit permeation of small gas molecules such as helium, such as airships or other lighter than air vehicles.

20 Claims, 2 Drawing Sheets

(51) Int. Cl.
*B64B 1/40* (2006.01)
*C08J 7/06* (2006.01)
*C09D 7/12* (2006.01)
*C08K 9/02* (2006.01)
*C09D 127/08* (2006.01)
*C09D 127/16* (2006.01)
*C08K 3/04* (2006.01)
*C08K 3/38* (2006.01)

(52) U.S. Cl.
CPC .............. *C08K 9/02* (2013.01); *C09D 7/1291* (2013.01); *C09D 127/08* (2013.01); *C09D 127/16* (2013.01); *C08K 3/04* (2013.01); *C08K 2003/385* (2013.01); *Y10T 428/19* (2015.01); *Y10T 428/24752* (2015.01)

(56) References Cited

U.S. PATENT DOCUMENTS

| | | | | |
|---|---|---|---|---|
| 6,302,357 B1* | 10/2001 | Kalisz | .................. | B64B 1/02 244/125 |
| 2004/0227197 A1* | 11/2004 | Maekawa | ............. | C23C 16/347 257/410 |
| 2006/0284204 A1* | 12/2006 | Yamazaki | ............. | H01L 27/322 257/98 |
| 2007/0238381 A1* | 10/2007 | Brewer | ................ | A41D 27/245 442/149 |
| 2007/0281570 A1* | 12/2007 | Liggett | .................... | B32B 5/26 442/378 |
| 2008/0166514 A1* | 7/2008 | Liggett | ................ | A41D 27/245 428/61 |
| 2009/0220726 A1* | 9/2009 | Liggett | .................... | B64B 1/14 428/77 |
| 2010/0159795 A1* | 6/2010 | Sarnstrom | ................. | A63H 27/10 446/220 |
| 2010/0163285 A1* | 7/2010 | Marinero | ................. | H05K 1/09 174/257 |
| 2010/0239797 A1* | 9/2010 | Alavi | ........................ | B32B 5/02 428/35.3 |
| 2011/0068320 A1* | 3/2011 | Marinero | ............... | B82Y 10/00 257/9 |
| 2011/0200825 A1 | 8/2011 | Chakraborty et al. | | |
| 2011/0233325 A1* | 9/2011 | Kramer | .................... | B64B 1/08 244/30 |
| 2011/0303121 A1* | 12/2011 | Geim | ..................... | B82Y 30/00 106/287.28 |
| 2012/0037748 A1* | 2/2012 | Schneider | ................. | B64B 1/08 244/2 |
| 2012/0068122 A1* | 3/2012 | Kranbuehl | ............. | B82Y 30/00 252/503 |
| 2012/0237789 A1* | 9/2012 | Wang | ....................... | C25D 5/54 428/626 |
| 2012/0251801 A1* | 10/2012 | Moore | ..................... | B64B 1/14 428/212 |
| 2012/0288433 A1* | 11/2012 | Sutter | .................... | B82Y 30/00 423/445 B |
| 2012/0301730 A1* | 11/2012 | Yagi | ....................... | B32B 27/00 428/447 |
| 2013/0059155 A1* | 3/2013 | Choi | ..................... | B82Y 30/00 428/408 |
| 2013/0062457 A1* | 3/2013 | Deakin | .................... | B64B 1/08 244/25 |
| 2013/0190956 A1* | 7/2013 | Zhamu | .................... | B61C 7/04 701/22 |
| 2014/0272350 A1* | 9/2014 | Kim | ....................... | C23C 16/26 428/213 |
| 2014/0370246 A1* | 12/2014 | Hurt | ..................... | C01B 31/043 428/189 |

OTHER PUBLICATIONS

Fei Guo et al; Graphene-Based Environmental Barriers; Environmental Science & Technology, vol. 46, No. 14, Jul. 17, 2012, pp. 7717-7724.
Exended European Search Report for application No. 13187758.1-130312719719; dated Mar. 19, 2014; 5 pages.

* cited by examiner

GAS BARRIER MATERIAL WITH ATOMIC SHEET

This application claims the benefit of U.S. Provisional Application No. 61/710,904, filed Oct. 8, 2012, the entire contents of which are incorporated herein by reference.

STATEMENT REGARDING FEDERALLY SPONSORED RESEARCH OR DEVELOPMENT

This invention was made with U.S. Government support under Contract Number 10615542. The U.S. Government has certain rights in this invention.

BACKGROUND

As polymeric materials have replaced traditional materials such as metal and glass as a more cost-effective, light-weight, and design-friendly alternative, certain desirable materials properties have been sacrificed in some applications. Gas permeation through the material is one of these properties. While metal and glass are completely non-permeable to gases, polymeric materials almost universally allow some level of gas permeation through the material. This property of polymers initially proved problematic in industries such as food packaging, where shelf-life is a function of the rate of oxygen permeability through the packaging material. Polymeric barrier materials have been developed to address this problem, but even the best polymeric gas barriers only slow the rate of gas permeation and cannot completely prevent it.

Polymeric materials have proven to be particularly problematic in applications where limiting the permeation of very small gas molecules, such as helium, is desired. Further, even structures made from gas impermeable materials are susceptible to helium leakage at joints or seams if such joints include polymeric materials such as adhesives.

SUMMARY

According to one or more embodiments, a gas barrier material includes a sheet of material having a characteristic gas permeability and one or more atomic sheet(s) arranged along the sheet of material so that the gas barrier material has a gas permeability less than the characteristic gas permeability of the sheet of material at locations along the gas barrier material where the one or more atomic sheet(s) are present.

According to one or more additional embodiments, a container having an internal volume of gas includes a panel in contact with the internal volume of gas, and the panel includes a sheet of material having a characteristic gas permeability. The container also includes one or more atomic sheet(s) located along the panel so that the panel has a gas permeability less than the characteristic gas permeability of the sheet of material at the location of the atomic sheet(s).

DRAWINGS DESCRIPTION

DETAILED DESCRIPTION

In accordance with the following description, a gas barrier material comprising an atomic sheet, such as graphene and/or analogs of graphene, is provided. The gas barrier material can be arranged as part of a component, such as a container or other vessel, to limit the flow of gas through the component. Where the component is a container or part of a container, the gas barrier material may be formulated and arranged to limit or prevent gas ingress or egress with respect to the internal volume of the container. The described atomic sheet offers improved gas barrier properties compared to traditional polymeric barrier materials and is particularly useful in applications where it is desired to limit permeation of small gas molecules such as helium.

Figure 1:
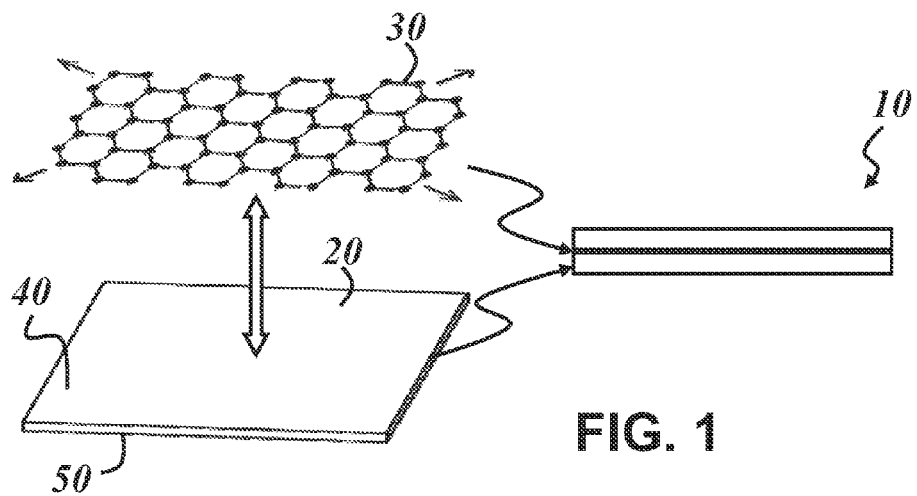
FIG. 1 is a schematic illustration of a sheet of material and an atomic sheet that are combined to form a gas barrier material, according to one embodiment.

With reference to FIG. 1, a gas barrier material 10 may include a sheet of material 20 that has a characteristic gas permeability and an atomic sheet 30, such as graphene. One or more atomic sheet(s) can be arranged along the sheet of material 20 so that the gas barrier material 10 has a gas permeability less than the characteristic gas permeability of the sheet of material at locations along the gas barrier material where the atomic sheet(s) are present. The sheet of material 20 may be or include a sheet of polymer-based material. As used herein, a polymer-based material is a material where the majority constituent is polymeric, whether thermoplastic or thermoset. Some examples of suitable polymer-based materials include poly(phenylene sulfone) (PPSU), ultra-high molecular weight polyethylene (UHMWPE), ultra-high molecular weight polypropylene (UHMWPP), poly(vinylidene chloride) (PVDC), or poly(vinylidene fluoride) (PVDF). PPSU is presently available under the Radel® trade name, UHMWPE is available in fiber form under the Dyneema® trade name, and certain PVDF copolymers are available under the Viton® trade name. The sheet of material 20 may be in solid and/or film form, or it may be a sheet of woven or non-woven fibers. While at least some of the examples of polymer-based materials listed here may have fairly good gas barrier properties, the inclusion of the atomic sheet 30, such as graphene and/or an analog of graphene, in the gas barrier material 10 can allow the use of other polymer-based materials that typically have average or below average gas barrier properties, thus allowing material properties other than the gas permeation properties of the sheet of material 20 to have more influence on material selection. In other embodiments, the sheet of material 20 includes or is a non-metallic material or an organic-based material.

The atomic sheet 30 is a one-atom-thick generally planar structure of covalently bonded atoms arranged in a repeating lattice structure and may also be referred to as a two-dimensional (2D) nanosheet. The atomic sheet 30 is thus characterized by a plurality of rings of covalently bonded atoms with at least one side of each ring shared with an adjacent ring of covalently bonded atoms. Some or all of the rings of atoms may be regular hexagonal rings and may together form a honeycomb-like structure, as is the case with graphene. In a repeating hexagonal ring structure such as graphene, each ring shares all of its sides with adjacent rings. Rings of atoms with other numbers of sides can also form generally planar atomic sheets 30, such as quadrilateral and octagonal rings. There is no requirement that all of the rings of covalently bonded atoms in the atomic sheet have the same number of sides, that every atom in each ring is the same atom, or that the planar structure is perfectly flat. Some examples of suitable atomic sheets are described in greater detail below.

Figure 2:
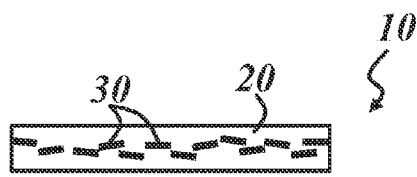
FIG. 2 is a schematic illustration of an embodiment of the gas barrier material including a plurality of atomic sheets in the form of flakes.

One or more atomic sheets 30 are arranged along the sheet of material 20 wherever improved gas barrier properties are desired. In one embodiment, the atomic sheet 30 is coextensive with the sheet of material 20, as shown in FIG. 1, and may impart the entire sheet of material 20 with enhanced gas barrier properties. In other words, the sheet of material 20 has a characteristic permeability to a particular gas, and the gas barrier material 10, which includes the atomic sheet or sheets 30, has a permeability to the same gas that is lower than the characteristic permeability of the sheet of material alone. Here, coextensive means that the atomic sheet 30 extends across the sheet of material 30 from edge to opposite edge in all planar directions. The coextensive atomic sheet 30 may not extend completely to the edges of the sheet of material 20, but it extends sufficiently close to the edges to perform its gas barrier function for the entire sheet of material when in use. The atomic sheet 30 may be intercalated in the sheet of material 20, as shown in FIG. 1. Some embodiments of the gas barrier material 10 include more than one coextensive atomic sheet 30. Any number of coextensive atomic sheets 30 can be arranged one over the other at opposite surfaces 40, 50 and/or within the thickness of the sheet of material 20. In some cases, a plurality of atomic sheets 30 that are each smaller than the sheet of material 20 may be arranged to at least partially overlap and effectively form a continuous and/or coextensive layer of atomic sheets. In one embodiment, the gas barrier material 10 includes a plurality of atomic sheets 30 embedded in the sheet of material 20 in the form of flakes, such as graphene flakes, as depicted in FIG. 2. Coextensive atomic sheets and non-coextensive atomic sheets, such as flakes, can also be combined in the gas barrier material 10. Submicron thick flakes of glass are also suitable for use in the gas barrier material to enhance the barrier properties of the sheet of material 20.

In one embodiment, the atomic sheet 30 is graphene. Graphene is a one-atom-thick planar lattice of covalently bonded carbon atoms arranged in a hexagonal or honeycomb-like lattice as shown in FIG. 1. As used herein, the term "graphene" includes the all-carbon structure shown, as well as functionalized graphene, where at least some of the carbon atoms are bonded with other moieties. In one example, the graphene is at least partially fluorinated, meaning that at least some of the carbon atoms are covalently bonded with a fluorine atom or a moiety that includes fluorine. In one such fluorinated structure, the graphene is saturated with fluorine, with each carbon in the graphene sheet having a covalently-bonded fluorine atom. Fluorographene can be produced by reacting graphene with fluorine-type plasmas (e.g., $F_2$, $CF_4$, $CH_2F_2$). Certain advantages of functionalized graphene are described in further detail below. Graphene oxide is another suitable atomic sheet 30. Graphene oxide is less black (i.e., has a lower emissivity) than native graphene, which may offer certain advantages in some applications as described below. Functionalized graphene or graphene oxide may include epoxy, carbonyl, and/or hydroxyl functional groups. Such functional groups can improve wettability of graphene or other atomic sheets with polymer-based sheets of material 20.

Figure 3:
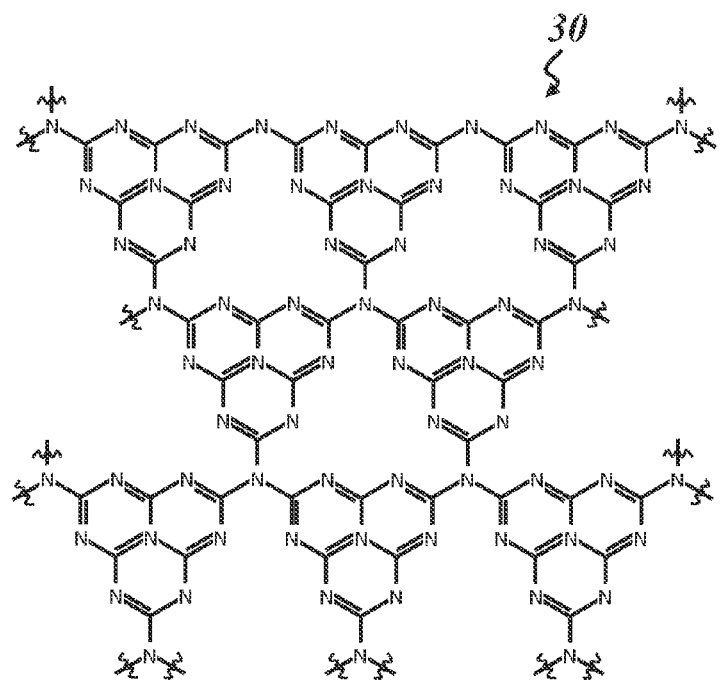
FIG. 3 illustrates structure of one embodiment of the atomic sheet for use in the gas barrier material.

FIG. 3 depicts another example of a suitable atomic sheet 30. In this example, the atomic sheet 30 is carbon nitride and is a graphene nitride analog. As shown in FIG. 3, the repeating 2D lattice structure includes alternating carbon and nitrogen atoms and is made up entirely of carbon-nitrogen bonds. A portion of the carbon-nitrogen bonds are double bonds included in hexagonal rings of alternating carbon and nitrogen atoms. The repeating structure in FIG. 3 includes groups of three hexagonal C—N rings, with each of the three rings sharing a side with the two other rings and each of the rings interconnected with another group of three C—N rings via a nitrogen linkage. The illustrated carbon nitride atomic sheet 30 has been found to be more transparent to visible light than graphene and may offer more controlled or lower emissivity than graphene. Other atomic sheet structures are possible, and the structures are not limited to hexagonal structures, carbon-based structures, or organic structures. Silicene and germanene, the silicon and germanium analogs of graphene, are suitable atomic sheets, as are certain zeolite structures and silicon oxide structures.

Figure 4:
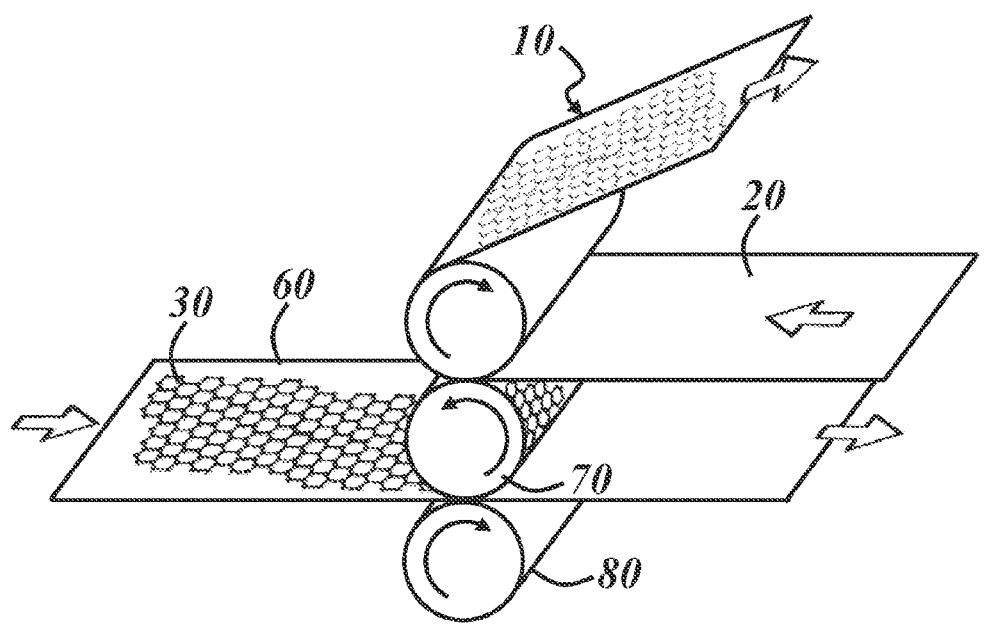
FIG. 4 is a schematic illustration of an illustrative method of making the gas barrier material.

FIG. 4 illustrates one embodiment of a method of making the gas barrier material 10. The illustrated method includes use of a roll-to-roll process, where the atomic sheet 30, in this case graphene, is transferred from a substrate or carrier 60 to the sheet of material 20. In the example of FIG. 4, the graphene sheet 30 is provided on a continuous metal foil as the carrier 60 and contacts a transfer roller 70, to which the graphene sheet 30 is transferred. The metal foil carrier 60 may be heated during the process to facilitate graphene transfer. The separately provided sheet of material 20 is brought into contact with the graphene sheet 30 on the transfer roller 70, and the graphene is transferred to the sheet of material 20. An additional roller 80 may be provided as shown to guide the sheet of material 20 into a sufficient transfer location and condition. In one embodiment, the sheet of material 20 is provided as an uncured polymer-based or adhesive sheet that undergoes a subsequent curing step, such as a heating step. In such a process, the graphene or other atomic sheet 30 may become at least partially embedded in the uncured sheet of material 20 when transferred thereto.

A continuous transfer process such as the roll process illustrated in FIG. 4 is useful to produce the gas barrier material 10 in large surface area form. This type of process may also facilitate controlled orientation of the atomic sheet 30 in the produced gas barrier material 10—i.e., the plane of the atomic sheet 30 is generally aligned with the plane of the sheet of material 20 and thus with the plane of the finished gas barrier material 10. Such alignment may optimize the gas barrier properties of the atomic sheet 30. The illustrated arrangement is only one example of a roll process. In other embodiments, a second sheet of material may be brought into contact with the graphene-laden sheet of material 20 to sandwich the layer of graphene of other atomic sheet between two sheets of material in laminate form to produce a gas barrier material where the atomic sheet 30 is intercalated in the laminated sheet of gas barrier material 10, as shown in FIG. 1, for example. In other embodiments, the transfer roller 70 is omitted and the atomic sheet 30 is transferred directly from the carrier 60 to the sheet of material 20. Other continuous or semi-continuous processes may be employed as well. For example, graphene flakes could be sprayed onto the sheet of material 20 as a mixture with a suitable solvent and binder, and the graphene flakes could be laminated between two or more sheets of material after solvent evaporation. It is contemplated that the layer of graphene or other atomic sheet 30 may be produced directly on the sheet of material 20 in batch or continuous processes as new methods of 2D-nanosheet synthesis are developed that are suitable for deposition on polymer-based sheets of material.

The above-described gas barrier material 10 may be particularly suitable for use as a helium barrier material. Helium is the smallest of the gases, having an atomic radius between 30-35 picometers, and thus represents one of the more challenging gases to contain in an otherwise airtight container. The density of helium is less than that of atmospheric air, and it is inert, making it the preferred gas for use in airships or dirigibles, such as that shown in FIG. 5. The illustrated airship 100 is a non-rigid airship and includes a helium-filled structure 110 that provides the main shape of the airship. The internal volume of the structure 110 is maintained at a pressure higher than the surrounding atmosphere and is defined by an otherwise flexible or collapsible skin or fabric shell 120. Rigid and semi-rigid airships may also include one or more helium-filled structures 110. As used herein, a helium-filled structure 110 is any gas-filled structure in which the gas comprises helium at a concentration higher than that of the surrounding atmosphere. In other words, the helium-filled structure is not necessarily filled with pure helium. For example, airships that include a helium-filled structure often include mechanisms to dilute the concentration of helium within the internal volume of the structure with another gas (e.g., air) during operation. In this manner, the density of the gas inside the helium-filled structure 110 can be changed and/or controlled to thereby allow control of the ascent and descent of the airship 100. Other lighter-than-air aircrafts (LTAs), such as free or moored balloons, may include a helium-filled structure.

Figure 5:
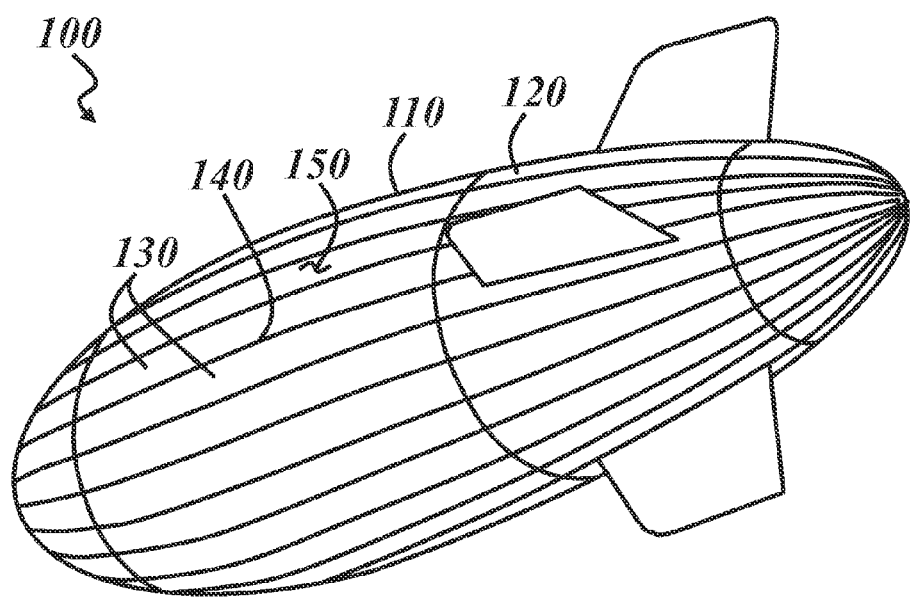
FIG. 5 is a perspective view of an airship having a helium-filled structure comprising a plurality of panels and seams, where the structure may include the gas barrier material.

One embodiment of the helium-filled structure 110 includes one or more panels 130 in contact with an internal volume of helium or helium-rich gas. The structure 110 includes the above-described atomic sheets, such as graphene, arranged along the panel(s) 130 to reduce the loss of helium from the structure. For example, the above-described gas barrier material may be used as a panel 130 of the helium-filled structure 110. The airship 100 depicted in FIG. 5 includes a plurality of panels 130 in contact with the internal volume of the helium-filled structure 110. Each individual panel 130 is represented in FIG. 5 by one of the quadrilateral shapes that make up the generally ellipsoidal structure 110. The panels 130 are arranged adjacent one another, side-by-side and edge-to-edge. Seams 140 are formed along edges of each panel 130 where an edge of one panel joins an edge of another panel. The seams 140 illustrated in FIG. 5 are represented by the grid of lines on the ellipsoidal structure 110. Any type of seam configuration may be employed, and each seam 140 may be airtight so that the enclosed volume of the structure 110 is airtight. Folded panel material, overlapping panel material, and adhesive layers are examples of some of the components that may be included as part of each seam 140.

Seams are common in airships having large helium-filled structures due to the impracticality of manufacturing a single large piece of material to serve as the helium-filled structure, particularly in the desired shape. But seams are potential gas leak paths and thus traditionally represent a necessary compromise in LTA design. Even with the most gas-impermeable panel materials, helium leakage can be problematic at the seams. For example, a seam may include an adhesive layer, such as epoxy or polyurethane. Though the adhesive layer it may help form an airtight seam, helium can permeate through the adhesive layer at a rate higher than the helium permeation rate through the panel material away from the seams. The above-described gas barrier material, including graphene or other atomic sheet, may be employed to help limit and/or reduce helium-permeation at the seams of a helium-filled structure.

In one embodiment, the helium-filled structure 110 includes a coating disposed over one or more panel(s) 130 of the structure, and the coating comprises graphene. In another embodiment, the coating is disposed over one or more seams 140 of the structure. All or part of each panel 130 and/or seam 140 may have the coating disposed thereover. For example, substantially an entire exterior surface of the helium-filled structure 110 may include the graphene coating. The coating may be disposed over the panels 130 and/or the seams 140 at the outside of the helium-filled structure 110 as part of the visible surface 150. Or the coating may be disposed over the panels 130 and/or the seams 140 at the inside of the helium-filled structure 110 as part of the non-visible surface, directly adjacent the internal volume of gas. In one embodiment, the coating is present at both outside and inside surfaces of the structure 110.

The graphene coating may be sprayed over the desired portions of the panels 130 or seams 140 as a mixture in a spray coating process or painted on using a brush, roller, or other applicator. In one embodiment, the coating mixture includes graphene flakes, a binder, and a solvent. Examples of suitable binder materials include poly(vinylidene halide)s, such as PVDF or PVDC. Examples of suitable solvents include acetone and t-butyl acetate. The binder may dissolve in the solvent, and the graphene flakes may be suspended in the solution. After application to the desired portions of the panels 130 and/or seams 140, the solvent is caused or allowed to evaporate, leaving behind the graphene coating in the form of graphene flakes in solidified polymer-based binder. Thus, the graphene coating itself is one example of the above-described gas barrier material, and the spray coating process is one method of making it. In one embodiment, the panels 130 of the helium-filled structure 110 are constructed in accordance with the above-described gas barrier material 10, such as that illustrated in FIGS. 1-4, and the coating comprising graphene is disposed over at least a portion of the structure. Of course, atomic sheets other than graphene may be used in addition to or in place of graphene in the described coating. For instance, the carbon nitride structure illustrated in FIG. 3 may be more transparent than graphene and thus provide a coating with lower emissivity than graphene in some cases. The advantages of low emissivity coatings are described further below.

The ability to provide the gas barrier material as a coating offers certain advantages, such as the ability to enhance the gas barrier characteristics of typically problematic seams after the seams are formed. The coating can be applied in multiple layers as well and may be used in repair situations in a manner that is much more cost-effective than replacement of panels or of the helium-filled structure itself. It may also allow for the use of panel materials not previously considered practical in helium-filled structure applications due to their high gas permeability rates.

As already noted, graphene may be functionalized. One potential benefit of functionalized graphene is color control. For instance, while a single atomic layer of graphene may be transparent to visible light, graphene flake or other bulk forms of graphene that may be used to form the described graphene coating may appear black. This may be problematic with LTAs because of the high level of light energy absorption by black bodies. This can lead to a significant temperature increase of the helium-filled structure and of the gas contained therein, resulting in an accompanying increase in pressure in the internal volume. Relieving temperature-induced pressure increases by allowing gas to escape from the structure would defeat the enhanced gas permeation properties of the above-described gas barrier material and coating. Additionally, in military applications, a black airship is highly visible against the lighter sky during daytime operations, which may be undesirable.

In one embodiment, the atomic sheet is graphene that is functionalized in a manner that affects the color of the graphene. For example, fluorographene that is fully fluorinated may be white or near-white in color, absorbing less light energy than neat graphene. Stated differently, fluorographene is more reflective and has a lower emissivity than unfunctionalized graphene. The graphene of the above-described coating may be partially fluorinated to provide a coating having an emissivity between that of the neat graphene coating and a fully fluorinated graphene coating. As used here, partially fluorinated graphene includes graphene where not all of the carbon atoms of the graphene sheet have a covalently-bonded fluorine atom, and it includes mixtures of fully fluorinated graphene with unfluorinated or partially fluorinated graphene. Thus a method of controlling the emissivity of the coating includes providing the graphene with a sufficient level of fluorination to achieve the desired emissivity or color. In this case, where fully fluorinated graphene is white and unfunctionalized graphene is black, the desired color will be a shade of gray. The coating can be tailored to blend with the sky in military applications and to absorb less energy from the sun than unfunctionalized graphene. It is contemplated that other graphene functionalization can result in colors other than white and in shades of such colors depending on the level of functionalization, while maintaining the superior gas barrier properties of the base graphene.

Some airships and LTAs have helium-filled structures with millions of liters of helium, and maximum flight duration is somewhat dependent on the rate of helium leakage. Using graphene or other atomic sheets as part of a gas barrier material as described above can allow extended flight times and lessen the need for midair refueling, which is sometimes difficult or impossible due to the complexities of helium transfer such as size and temperature considerations.

The gas barrier material and coating described above are not limited to use in LTAs or even to use in helium-filled structures. The gas barrier capabilities of the disclosed materials comprising an atomic sheet such as graphene are useful in any application where a reduction in gas permeability is desired. The above-described helium-filled structure is only one type of container with an internal volume to or from which it may be desired to limit gas permeation. For example, the gas barrier material may be useful in food packaging containers, where permeation of atmospheric oxygen or other reactive gases through the packaging can spoil food. Polymeric barrier layers such as PVDF can extend the shelf life of food packaged in relatively permeable plastics such as HDPE or PP, but shelf life is still limited, as the permeation rate is only slowed rather than stopped. Presently, only metal or glass containers can offer near-zero gas permeation. An atomic sheet such as graphene may be used with polymeric sheet materials, thus providing near-zero oxygen permeation in a material that weighs less and/or is less fragile than glass or metal. Additionally, the atomic sheet can be transparent so that, when combined with a transparent or partly transparent polymer-based sheet of material, a food packaging container is provided in which the contents are visible, as with glass containers, without the weight or brittleness of glass.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An airship comprising a container having an internal volume of gas, the container comprising a gas barrier material, the gas barrier material comprising:
   a sheet of material having a characteristic gas permeability; and
   one or more atomic sheets arranged along the sheet of material so that the gas barrier material has a gas permeability less than the characteristic gas permeability of the sheet of material at locations along the gas barrier material where the one or more atomic sheets are present,
   wherein the one or more atomic sheets comprises graphene that is at least partially fluorinated or carbon nitride.

2. The airship of claim 1, wherein the one or more atomic sheets comprises graphene.

3. The airship of claim 2, wherein the graphene is functionalized.

4. The airship of claim 1, wherein the one or more atomic sheets comprises carbon nitride.

5. The airship of claim 1, wherein the one or more atomic sheets comprises at least one atomic sheet intercalated in the sheet of material.

6. The airship of claim 1, wherein the one or more atomic sheets includes a plurality of at least partially overlapping atomic sheets.

7. The airship of claim 6, wherein the plurality of atomic sheets is in the form of flakes.

8. The airship of claim 1, wherein the one or more atomic sheets are arranged along the sheet of material as a coextensive layer.

9. An airship comprising a container having an internal volume of gas, the container comprising:
   a panel in contact with the internal volume of gas, the panel comprising a sheet of material having a characteristic gas permeability; and
   one or more atomic sheets located along the panel so that the panel has a gas permeability less than the characteristic gas permeability of the sheet of material at the location of the atomic sheets, wherein the one or more atomic sheet(s) comprises graphene that is at least partially fluorinated or carbon nitride.

10. The airship of claim 9, wherein the one or more atomic sheets comprises at least one atomic sheet intercalated in the sheet of material.

11. The airship of claim 9, wherein the one or more atomic sheets comprises at least one functionalized atomic sheet.

12. The airship of claim 9, further comprising a coating disposed over at least a portion of the panel, wherein the coating comprises at least one of the one or more atomic sheets.

13. The airship of claim 9, further comprising:

a plurality of panels, each panel having an edge;

a seam formed where the edge of one of the panels joins the edge of another panel; and a coating comprising at least one of the one or more atomic sheets, wherein the coating is disposed over the seam.

14. The airship of claim 9, wherein the sheet of material comprises a sheet of polymer-based material and at least one of the one or more atomic sheets is intercalated in the sheet of polymer-based material.

15. The airship of claim 9, wherein the sheet of material comprises a sheet of polymer-based material and at least one of the one or more atomic sheets is arranged along the sheet of polymer-based material as a coextensive layer.

16. The airship of claim 9, wherein the internal volume of gas comprises helium.

17. The airship of claim 9, further comprising an exterior coating comprising at least one of the one or more atomic sheets.

18. The airship of claim 17, wherein the coating comprises fluorinated graphene.

19. The airship of claim 18, wherein the fluorinated graphene is partially fluorinated graphene.

20. A method of making the airship of claim 9, comprising the steps of:

at least partially filling the container with gas; and applying a solution over an exterior surface of the container, wherein the solution comprises a plurality of the atomic sheets in the form of flakes.

* * * * *